United States Patent [19]

Bergan et al.

[11] Patent Number: 5,090,493
[45] Date of Patent: Feb. 25, 1992

[54] LOAD CELLS AND SCALES THEREFROM

[75] Inventors: Terry Bergan; Brian Taylor, both of Saskatoon, Canada

[73] Assignee: International Road Dynamics Inc., Saskatchewan, Canada

[21] Appl. No.: 604,475

[22] Filed: Oct. 29, 1990

[51] Int. Cl.$^5$ .................... G01G 3/14; G01G 3/08; G01L 1/22
[52] U.S. Cl. .................... 177/211; 177/229; 177/128; 73/862.65; 338/5
[58] Field of Search .................... 73/862.65; 177/128, 177/134, 211, 229; 338/5

[56] References Cited

U.S. PATENT DOCUMENTS

| | | | |
|---|---|---|---|
| 3,327,270 | 6/1967 | Garrison | 338/5 |
| 4,280,363 | 7/1981 | Johansson | 338/5 X |
| 4,478,091 | 10/1984 | Forrester | 73/862.65 X |
| 4,553,124 | 11/1985 | Malicki | 73/862.65 X |
| 4,957,178 | 9/1990 | Mills | 177/134 |

Primary Examiner—George H. Miller, Jr.
Attorney, Agent, or Firm—Nixon & Vanderhye

[57] ABSTRACT

A novel load cell for use in novel wheel load scales and novel weigh-in-motion scales is provided herein. The load cell comprises a metal rod or bar, with a strain transducer secured to a flattened portion of each of the upper and lower faces of the metal bar. A signal wire has its terminal secured to an end face of each of such strain transducer, and a strain relief means is interposed between each such signal wire terminal and its associated strain transducer. When mounted within a closed bore which is parallel to the upper surface of a flat plate of elastic material, e.g., sheet metal, in a particularly-recited manner, an improved wheel load scale or weigh-in-motion scale is provided. This provides a light weight, low profile, scale which is isolated from external interference, which improves the accuracy of the scale.

24 Claims, 3 Drawing Sheets

LOAD CELLS AND SCALES THEREFROM

BACKGROUND OF THE INVENTION (i) Field of the Invention

This invention relates to load cells, which are especially useful for wheel load scales and weigh-in-motion scale.

(ii) Description of the Prior Art

There are many types of load cells. For example, some types of load cells are operable in response to changes in reluctance of magnetic circuits, such load cells being capable of measuring compressive forces only, tensile forces only, or both compressive and tensile forces. Known such types of load cells typically consist of a rigid steel beam supported at its opposite ends in a manner such that its mid-section may deflect downwardly in response to a weight load from the weighbridge platform.

The load cell typically includes a number of strain transducers, generally referred to as strain gauges, affixed to its lower surface. Downward deflection of the load cell is manifested by tensile stresses in the lower surface of the load cell. The strain gauges respond to such stresses by producing an electrical signal that varies in magnitude with the extent of the load cell deflection. The load cell and its strain gauges are calibrated such that the assembly can be used accurately and reproducibly to measure weight loads on the load cell. In operation of the platform scale, the electrical outputs from the tow load cells under the opposite ends of a weighbridge platform are combined electronically to obtain a measure of the total weight load on the platform.

Many patents are directed to weighing scales which make use of the above-described type of load cells. For example, U.S. Pat. No. 4,261,429, issued Apr. 14th, 1981, to H. E. Lockery, provided a scale including a platform and transducer elements which are combined so that the transducer elements form integral components of the platform proper. For this purpose slots were milled, machined or cut into the platform so that two parallel slots defined a beam structure, the sensitivity of which was established by drilling holes into the platform, at the end of each slot and intermediate the ends of each slot. Strain gage elements were then secured to the so-formed beam structures, the free ends of which were operatively connected to support elements. Mounting means, preferably of resilient material, were secured through spacer elements to the free end of the beam structures serving to support the weighing apparatus on the mounting surface. Overload limiting means were so arranged that the flexing of each beam structure is limited to a predetermined value.

U.S. Pat. No. 4,565,255, patented Jan. 21st, 1981, by M. Serrazin, provided a weighing device in which the opposite ends of a metal bar placed between a weighing platform and a base plate were rigidly fixed respectively to the platform and to the base plate. The metal bar carried flexure-sensitive strain gauges and torsion-sensitive strain gauges for cancelling the torsional stresses detected by the gauges. Two pairs of flexure-sensitive strain gauges were mounted on one face of the bar and aligned along the bar axis. The gauges of each pair were connected in opposition of sign in a Wheatstone bridge circuit and an electric signal, which was proportional to the force applied on the weighing platform, was measured at the bridge terminals.

U.S. Pat. No. 4,581,948, patented Apr. 15th, 1986, to K. W. Reichow, provided a load cell assembly which included a deflectable load cell having strain transducers which measured the downward deflection of the load cell in response to a load. The load cell included grooves in the lower surface thereon in the vicinity of each end thereof. A rocker pin was positioned in each groove, the groove being configured in such a manner that the pin was captured therein, so that the pin in the groove acted in operation to restrain the load cell, but so that the pin extended below the lower surface of the load cell. The pin was generally barrel-shaped, having its greatest dimension at its centre, so that the load cell was supported on a small area of the pin, generally about the centreline of the load cell. The load cell assembly also included two end mounts for supporting the respective ends of the load cell. The load cell assembly also included two end mounts for supporting the respective ends of the load cell, each end mount including means for receiving the ends of the rocker pins, which extended beyond the side surfaces of the load cell.

U.S. Pat. No. 4,666,003, patented May 19th, 1987, by K. W. Reichow, provided a load cell for on-board weighing applications, including an elongated sheer force measuring beam which included mounting means for securing the opposing longitudinal ends of the beam to the frame of the vehicle. The load was applied against the upper surface of the beam through a platform. The shear strains caused by the load were concentrated in an area near each end of the beam. The strain measuring means were located in holes in the sides of the beam in the shear force areas and measured the shear strains on the beam, which in turn were representative of the weight of the load.

U.S. Pat. No. 4,785,896, patented Nov. 22nd, 1985, by W. E. Jacobson, provided a load sensing structure for weighting which had a rectangular deck with four flexure members supporting the deck. Each flexure member had attachment portions secured to the deck and oppositely-facing attachment portions secured to a fixed platform. U-shaped flexure intermediate portions had parallel legs or beams that were connected to one another by a rigid base of the U, and these legs were also cantilever connected to the attachment portions. Two strain gauges on one such leg were so located that these gauges must sense tension and compression to indicate weight in the bridge circuit. If both detect tension or both compression no weight indication will occur.

U.S. Pat. No. 4,858,710, patented Aug. 22nd, 1989, by M. R. Krause, provided a load cell, in particular for weighing systems, comprising a deformable member, this deformable member has an aperture extending transversely of the direction of the force, which is closed by at least one disc-shaped wall which corresponds to the cross-section of the aperture and extends transversely of the axis of the aperture and serves to receive strain gauges which are deposited by means of a film technique. The deformable member is formed by two sub-members, which are welded together in a plane which extends transversely of the axis of the aperture. A wall is provided in the aperture of each sub-member, at least one wall being provided at its interior side with strain gauges.

While in the prior art, wherein the platform was connected to the base by flexural members, the number of transducers was reduced, the flexural members and the base must be carefully assembled and adjusted so that the single transducer will sense only the vertical load applied to the upper platform. Making such scales insensitive to off-centre loads had been found to be difficult, time consuming, and expensive. Substantially the same considerations applied to a prior art structure wherein the flexural members were an integral part of the single transducer. That type of structure was also sensitive to off-centre loads unless expensive mechanical or electronic adjustments are made to reduce the effects of off-centre loading.

One arrangement of the strain gauges in the prior art made it possible to measure at the output terminals of the Wheatstone bridge a signal which was theoretically proportional to the force applied on the weighing platform. In view of the fact that the resultant of the forces applied on the platform may be located at a point remote from the axis of flexure of the bar, the torsional stresses to which the bar may be subjected were liable to produce measurement errors which can attain 5 to 6%.

Another arrangement of the prior art made it possible to cancel the torsional stresses detected by the flexure-sensitive strain gauges. However, the arrangement of the four flexure-sensitive strain gauges on two opposite faces of the bar had the effect of introducing a considerable complication in the mass production of the weighing device and in the calibration of the device.

Yet another arrangement of the prior art was the so-called "floating" load cell.

A floating load cell is characterized by being freely supported off of its respective ends, typically by means of a pin which was positioned in a groove in the lower surface of the load cell. In such a load configuration, the ends of the load cell were not bolted or otherwise rigidly fixed in position, so that the load cell was free to deflect downwardly about the supporting pins. However, even in a floating load cell, it was still necessary to support the ends of the load cell and to prevent the load cell from lifting off the pin. Previous attempts to provide such support, however, had significant disadvantages. The support assemblies generally were bulky and relatively expensive. Further, and perhaps most importantly, the results of weigh platforms using such support assemblies for the load cells were characterized by severe inaccuracies, due to uneven surfaces on which the load cell was positioned and collection of debris in the support assemblies.

Weighing systems for on-board application have typically used a bending beam type load cell. However, such load cells in use experienced difficulties with breakage and cracking in particular areas of the load cell. Further, debris, including snow, ice, and mud, frequently accumulated in the area directly beneath the lower surface of the load cell beam, inhibiting the bending of the load cell, which in turn impaired the accuracy of the reading.

Still further, such load cells have proven to be vulnerable to moisture. The strain gauges which were used in the load cells were very sensitive to moisture, even to changes in humidity, and prior art on-board load cells have been difficult to protect against moisture, even with the application of state-of-the-art potting and/or sealing methods and materials. The above-described disadvantages result in a relatively high failure rate for conventional on-board load cells, which can impair the safe operation of the vehicle, and increase operational expense.

Inaccurate measurement of the applied load results unless the load is applied along a line which is virtually coaxial of the cell. That is, the known constructions are not immune from inaccuracies caused by laterally applied forces.

Others of the known load cells were subject to still other disadvantages, e.g., variations in reliability in response to changes in temperature, the inability to be adjusted for the accommodation of widely varying load factors, the likelihood of damage due to overloads, high manufacturing and maintenance costs, and complexity of assembly.

The prior art has already provided a wheel load indicator, which comprised a flat plate of elastic material which had measuring properties, the plate being adapted to be supported at two opposed lateral edges and including recesses disposed in pairs and formed webs between them to which strain gauges were attached for detecting shearing stresses.

In one known wheel load indicator of this kind the webs each were formed between circular enlargements of a pair of recesses, and strain gauges were adhered to the opposed walls of these enlargements, i.e., to the two opposed web walls. The recesses themselves were closed.

In another known wheel load indicator the recesses formed a web between them which were of slot-like design starting from the lateral edges of the plate. The strain gauges were adhered to the webs in the plane of the upper surface of the plate. With such an arrangement, nothing but bending stresses of a plate loaded by a wheel could be determined.

U.S. Pat. No. 4,616,723, patented Oct. 14, 1966, by L. Pietzasch et al, provided a wheel load indicator which provided that two closed cavities be arranged spaced from each other in each web and with walls extending in the cross-sectional direction of the plate, the strain gauges being attached to the walls to measure the sheer stresses within the webs. Upon introducing and adhering the strain gauges to the walls of the cavities, the latter could be closed hermetically in simple manner by using sealing plugs or the like. Thus, the measuring elements and their places of attachment as well as their electrical terminals were housed in surroundings protected from any harmful outside influences.

In this patent, the strain gauges were adhered to parallel, planar wall portions of the bore walls which were each located adjacent the neighbouring recesses, at uniform spacings from the lateral edge of the plate. Thus, each bore contained only one strain gauge. In a further modification, the plate was propped on the ground by having each web rest on a base member by way of a support, while the remaining plate areas were unsupported. Thus, the plate was supported along its two opposed lateral edges exclusively by the webs serving as "claws" and their supports.

In this patent, these supports preferably were arranged between the two bores of each web and were designed as point supports which supported the corresponding web on each of two base members extending below the lateral edges.

In this patent, the places of attachment of the strain gauges, as seen in the direction of the web width, were so selected that they coincided with the places of the least shearing deformation due to transverse bending of the webs.

SUMMARY OF THE INVENTION

(i) Aims of the Invention

It is the aim of the present invention to achieve the following objects singly or in combination: to simplify the manufacture of scales of the described type by integrating the platform structure and the strain gauge transducer or transducers in a unitary structure; to reduce the costs of such scales and to simplify their calibration and adjustment while simultaneously assuring performance and accuracy which is at least equivalent to comparable scales of the prior art; to construct the scale in such a manner that its output is relatively independent of the position of the load applied to the scale, or stated differently, insensitive to off-centre load applications; to support the integral scale platform and bending beam transducer structures in such a manner that the desired type of deflection of the integrated transducers is established to optimize the linearity characteristics and hysteresis effects; and to minimize the effect of shock loads on the scale.

Another object of this invention is to provide a load cell construction which is immune from side thrusts and thus is capable of measuring accurately the actual compressive or tensile components of loads imposed on the load cell.

A further object of the present invention is to provide a load cell constructed of common, easily manufactured and assembled parts, thereby minimizing initial, assembly and maintenance costs.

Still another object of the present invention is to provide a wheel load scale which can be placed ahead of a vehicle's tires, so that the vehicle will ride onto a scale provided with a sensor, the sensor will then develop a signal as a result of the weight of the wheel so that the sensor will be able to weigh the wheel by interpreting the signal generated.

Yet another object of this invention is to provide a flat wheel load scale of low weight which is easy to transport and of high accuracy in the class of gross scales, the manufacturing expenses being limited.

Yet a further object of this invention is to provide a wheel load scale that yields very accurate measuring results, regardless of the direction of movement onto the scale.

In other words, according to this invention, the wheel load scale may be traversed in a direction transversely of the lateral edges, i.e., in longitudinal direction of the webs as well as in the longitudinal direction of the lateral edges or in inclined direction with respect to the same.

A still further object of this invention is to provide a portable wheel load scale of simple structure which is easy to manufacture and yet assures high measuring accuracy.

(ii) Statement of Invention

By this invention a load cell is provided comprising a metal rod or bar, a strain transducer secured to a portion of each of the upper and lower faces of the metal bar, a signal wire having its terminal secured to an end face of each of the strain transducer, and a strain relief means interposed between each such signal wire terminal and an associated strain transducer.

By this invention a wheel load scale is provided comprising: flat plate adapted for support at its lateral edges, the plate having its lateral edges slotted to form a plurality of laterally-extending webs; a single cavity extending into each of the webs from the lateral edges thereof; and a load cell removably slidably disposed within each such cavity, such load cell comprising a metal rod or bar, a strain transducer secured to a portion of each of the upper and lower faces of the metal bar, a signal wire having its terminal secured to an end face of each of the strain transducer, and a strain relief means interposed between each such signal wire and an associated strain transducer, the strain transducer being unadhered to any wall of the cavity.

By this invention, a weigh-in-motion scale is provided comprising: a flat plate of elastic material having measuring properties, the plate being adapted to be supported at two opposed lateral edges and including pockets disposed in pairs and forming webs between them; a single closed cavity provided in each web extending in a direction substantially-parallel to the upper surface of the plate; and a load cell removably slidably disposed within each cavity, the load cell comprising a metal rod or bar, a strain transducer secured to a portion of each of the upper and lower faces of the metal bar, a signal wire having its terminal secured to an end face of each of the strain transducer, and a strain relief means interposed between each such signal wire and an associated strain transducer, the strain transducer being unadhered to any wall of the cavity.

(iii) Other Features of the Invention

In one feature of the load cell of this invention, the strain transducers are preferably situated on reduced thickness portions of the metal rod or bar. In one feature of the load cell of this invention, the strain transducer preferably is a very thin electrical resistance-type strain gauge which is adhered to the load cell. In one feature of the load cell of this invention, the gauge should measure both tensile and compressive strain. One embodiment of such electrical resistance-type gauge is a thin film of highly polarized polyvinylidene fluoride.

In one feature of the load cell of this invention, the signal wire preferably is disposed within a respective groove in the reduced thickness portion of the metal bar.

In one feature of the load cell of this invention, the terminal between the signal wire and the strain transducer comprises a solder terminal.

In one feature of the load cell of this invention, the strain relief means preferably is a strain relief bubble.

In one feature of the wheel load scale of this invention, the cavities are preferably formed by closed bores. In one feature of the wheel load scale of this invention, the bores start from a lateral edge of the plate and extend transversely into the plate. In one feature of the wheel load scale of this invention, each longitudinal side of the plate is preferably provided with two such webs.

In one feature of the wheel load scale of this invention, each web is preferably supported by a depending foot, and the other areas of the plate are preferably unsupported.

In one feature of the wheel load scale of this invention, each plate may be made of steel or aluminum or of a high-strength light metal alloy, e.g., the aluminum alloy AlZnMgCu.

In one feature of the wheel load scale of this invention, a handle may be provided in each lateral edge of the plate, and a display panel may be mounted on a transverse edge of the plate. In one feature of the wheel load scale of this invention, the display panel preferably is supplied with electrical power from a storage battery. In one feature of the wheel load scale of this invention, the storage battery may be charged through a charging connector.

In one feature of the weigh-in-motion scale of this invention the cavities are preferably formed by closed bores. In one feature of the weigh-in-motion scale of this invention the pockets must be spaced from the lateral edges of the plate, but the bores start from a lateral edge of the plate and extend transversely into the plate. In one feature of the weigh-in-motion scale of this invention each longitudinal side of the plate is preferably provided with three such webs. In one feature of the weigh-in-motion scale of this invention each web is preferably supported by a depending foot, and the other areas of the plate are unsupported.

In one feature of the weigh-in-motion scale of this invention the plate may be made of steel or aluminum or of a high-strength light metal alloy, e.g., the aluminum alloy AlZnMgCu.

(iv) Generalized Description of the Invention

This invention thus primarily provides an improved load cell which can be used to manufacture a wheel load scale or a weigh-in-motion scale, such scales being of low profile, rugged, and reliable. This invention relates both to the overall design of the scale plate for such scales and the design of the load cell. The load cell assembly described herein provides accurate, reproducible results and is capable of operating for extended periods under harsh operating conditions.

The load cells of this invention can be used to manufacture, in one embodiment, a truck wheel load scale which is intended for use as a portable truck wheel and axle weigher.

The main advantages of this wheel load scale over conventional wheel load scales is a lower cost and a substantial reduction in the height of the sensor and reduced weight.

The main features of the wheel load scale are: the load transducer is used as the active element for weighing; the sensor is low profile and lightweight; the sensors can be used accurately to weigh wheel loads; two scales can be electronically connected together to provide the summation of wheels or axle weights; the sensor uses discrete loading members to load the load transducer; and the platforms are designed to concentrate the stress load to the areas where the load transducer is located.

One embodiment of the wheel load scale consists of a machined steel or aluminum or aluminum alloy [AlZnMgCu] plate which transfers a load into the four sensors or load cells, one located at each corner. The scale makes contact with the ground through feet or load pads which attach to the frame. The load pads and the milled out geometries in the frame serve to concentrate the bending and deflections into the areas where the load cell is located.

The load cells of this invention can be used to manufacture, in another embodiment, a weigh-in-motion scale.

The main advantages of this weigh-in-motion scale over conventional weigh-in-motion scales is a lower cost and a substantial reduction in the height of the sensor and reduced weight.

The main features of the weigh-in-motion scale are: the load transducer is used as the active element for weighing; the sensor is low profile; the sensors can be used accurately to weigh moving vehicles; the sensor uses discrete loading members to load the load transducer; and the platforms are designed to concentrate the bending load to the areas where the load cell is located.

One embodiment of such weigh-in-motion scale consists of a scale frame having an inner peripheral framework to which are mounted three scale frame bearing pads along each lateral framework member. A machined steel or aluminum, or a aluminum alloy [AlZnMgCu] plate has six scale mounting feet to transfer a load onto six sensors, located within the plate with three sensors situated along each lateral edge. The scale makes contact with the ground through feet or load pads which attach to the frame. The load pads and the milled out geometries in the plate serve to concentrate the bending and deflections into the areas where the load cells are located.

The load cells are designed to produce a large signal due to a small deflection. Two strain gauges are located on each load cell. One strain gauge is located on the tension side and the other strain gauge is located on the compression side of the load cell. This eliminates any anisotropic effects that may be present in the load cell to frame interface. The diameter of the load cell has been maximized to permit the strain gauges to be located further from the neutral axis and, thus, are located for maximum strain.

The configuration of the strain gauges into a series bridge serves the purpose of increasing the total resistance thus reducing the electrical current necessary to excite the bridge. It also permits a higher voltage to be applied to the bridge without the effect of self-heating of gauges becoming a factor.

The electronic circuitry for measuring the small change in resistance of the bridge has incorporated the low power electronic technology. Low power consumption has been designed into the scale to permit longer portable operation between recharging of batteries. The most significant power saving technique incorporated into the electronic interface is the excitation of the bridge for very short periods of time. This technique requires a more sophisticated analog design to obtain the equivalent steady state bridge output. However, the increased performance and the reduced battery requirement offsets the increased electronic development effort required.

Figure 1:
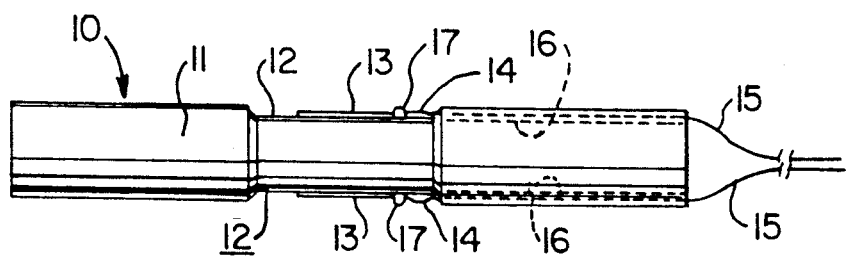
FIG. 1 is a central longitudinal cross-section of a load cell of one aspect of this invention which can be used to provide various weighing scales.
Figure 2:
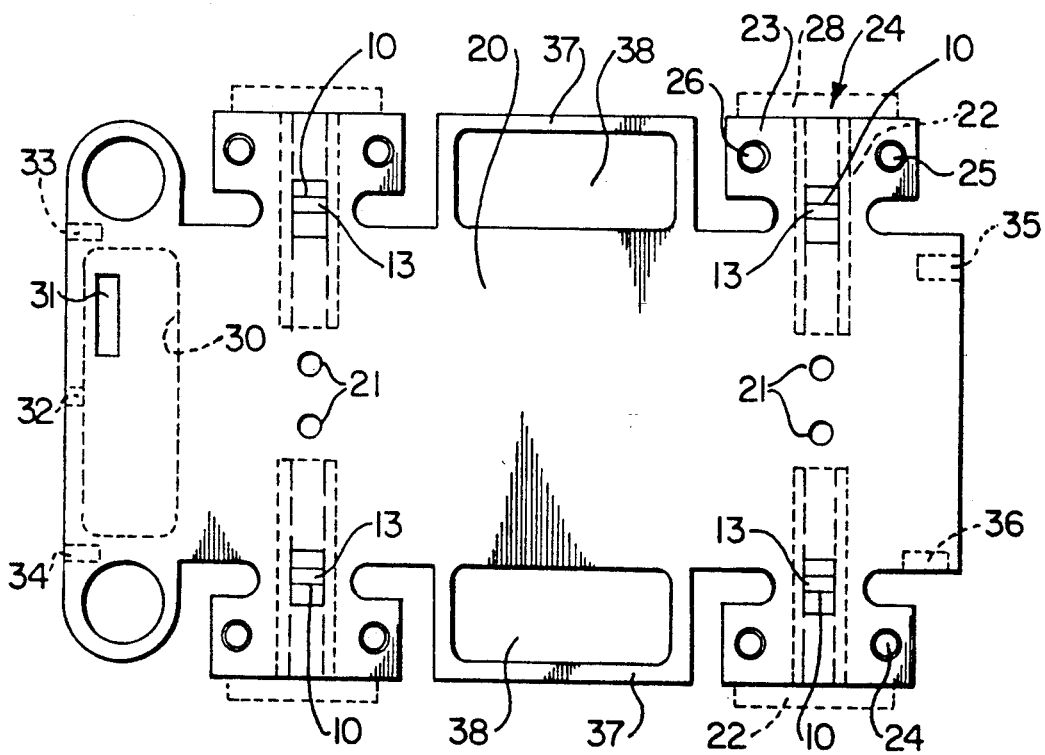
FIG. 2 is a top plan view of a wheel load scale of another aspect of this invention.
Figure 3:
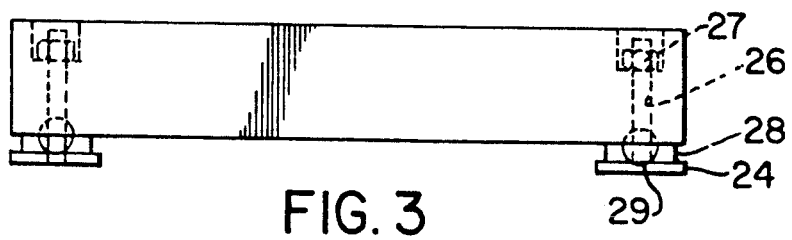
FIG. 3 is an end view of the wheel load scale of FIG. 2.
Figure 4:
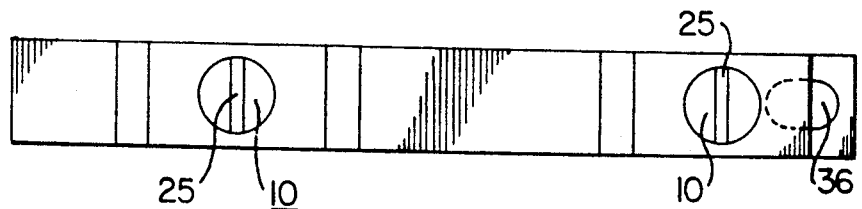
FIG. 4 is a side view of a wheel load scale of FIG. 2.
Figure 5:
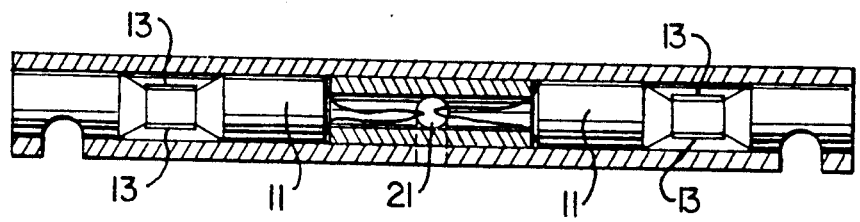
FIG. 5 is an end view cross-section of the wheel load scale of FIG. 2.
Figure 6:
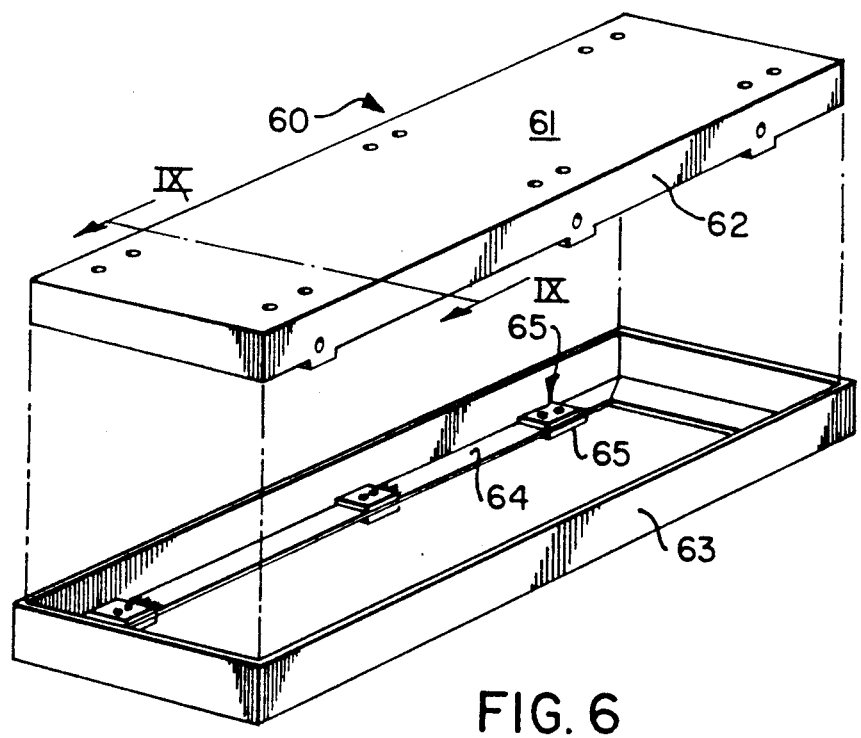
FIG. 6 is an exploded perspective view of a weigh-in-motion scale of another aspect of the present invention.
Figure 7:
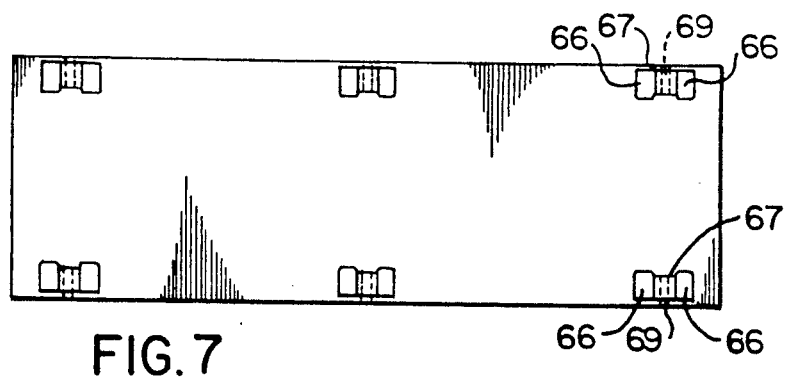
FIG. 7 is a bottom plan view of the weigh-in-motion scale of FIG. 6.
Figure 8:
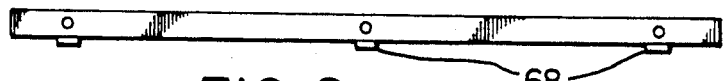
FIG. 8 is a lateral edge view of the weigh-in-motion scale of FIG. 6.

DESCRIPTION OF PREFERRED EMBODIMENTS (i) Description of FIG. 1

As seen in FIG. 1, the load cell 10 includes a generally circular cross-section steel rod 11, provided with a pair of diametrically-opposed, partial planar surfaces 12 providing the rod 11 with a reduced thickness. Mounted on each of the planar surfaces 12 is a strain transducer 13, each connected, by solder 14, to a signal wire 15. Each signal wire is disposed in a wire groove 16. Between the end of the strain transducer 12 and the solder terminal 14 is a strain relief bubble 17.

The strain transducer preferably is an electric resistance-type strain gauge, which is adhered to the metal load cell, and which changes resistance proportional to the strain. One example of such electric resistance-type strain transducer is a highly polarized polyvinylidene fluoride film.

The sensor is designed to operate over a wide temperature range.

(ii) Description of FIGS. 2-5

As seen in FIGS. 2-5, one embodiment of a wheel load scale includes a weigh platform 20 supported at each of its four corners by a load cell 10 according to an aspect of this invention which has been previously described in FIG. 1. The signal wires 15 (see FIG. 1) pass through access holes 21 in the base of the scale platform 20.

The provision of strain transducers in both the upper and lower surfaces of the load cell, as described hereinbefore in FIG. 1, provides a more accurate weighing.

Each load cell 10 is disposed within a closed-end bore 22 in a flexible wing portion 23 of the platform 20. The wing portion 23 is secured to a hard metal pad foot or base 24 by means of a pair of bolts 25, passing through pad mounting holes 26 and held in place by a respective nut 27. The mounting is covered by a duct cover gasket 28 with a hard dowel bearing 29 also being provided to assist in the transmittal of the bending moment.

The scale platform 20 is also provided with a well 30 accommodating instrumentation electronics through an access. The instrumentation includes a LCD display 31, a charger LED 32, an on/off switch 33 and a cycle switch 34. The scale platform 20 is also provided with a charging connector 35 and an access 36. The scale platform 20 also includes a pair of handles 37, each defined by handle hole 38.

(iii) Description of FIGS. 6-11

A weigh-in-motion scale 60 is shown in FIGS. 6-11. As seen, the scale 60 includes a generally-rectangular plate 61. Along each of the longitudinal faces 62 of the plate 61, three load cells 10 as described hereinabove in FIG. 1 are mounted within closed-end bores as will be described in greater detail hereinafter. The plate 61 is disposed within a frame 63 which includes an inner peripheral framework 64 on which is mounted three bearing pads 65 along each lateral portion. The mounting of the plate 61 to the framework 63 will be described hereinafter.

Figure 9:
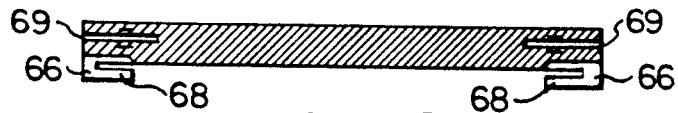
FIG. 9 is a cross-section along the line IX—IX of the weigh-in-motion scale of FIG. 6.
Figure 11:
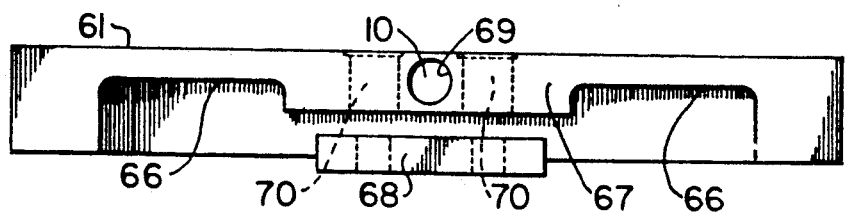
FIG. 11 is another view of the construction of the scale of FIG. 6.

The underface of the plate 61 is provided with three sets of spaced-apart recesses 66, each recess being spaced from the lateral edge of the plate 61. Between each pair of adjacent recesses 66 is a shallower recessed plate portion 67, which is covered by a mounting foot 68. A closed-end bore 69 is provided from each lateral edge into each recessed plate portion 67. This provides a cross-sectional structure as shown in FIGS. 9 and 11.

Figure 10:
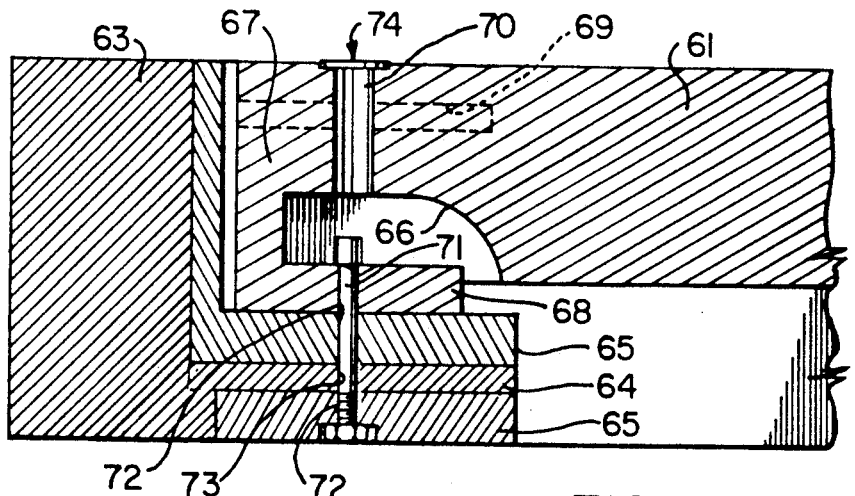
FIG. 10 is a detail of the mounting of the load cell in the weigh-in-motion scale of FIG. 6 within the framework.

FIG. 10 shows how the scale plate 61 is secured to the frame 63. A pair of bores 70 is drilled between the upper surface of plate 61 and the lower surface of foot 68. A bolt 71/nut 72 combination is passed through each bore 70 and through mating bores and 73 in bearing pad 65 and peripheral framework 64. The upper surface of plate 61 at bores 70 is covered by a hole plug 74. The load cell 10 is disposed within bore 69 so that each stress transducer 13 is parallel to the respective upper and lower surfaces of plate 61.

The steps in the manufacture of the weigh-in-motion scale are as follows:

Each weigh pad is manufactured from a single piece of steel or aluminum or aluminum alloy plate, especially of a size 24"×72"×1¾". Six pockets are machined in the weigh pad 1⅛" deep at the deepest point, ⅝" deep where the bearing pad is located. The bearing pad pockets are located along the lateral edges of the plate, three per side for a total of six. A metal foot is installed at each bearing pad location. This foot is bolted to the bearing pad on the scale frame. The foot is welded to the plate and later is machined for accurate alignments. The metal foot extends ¼" below the scale, providing under clearance for the scale.

After the feet are installed, a wire protection track is installed on the underside of the plate, along with a cable junction box. The entire plate is then galvanized for corrosion protection, e.g., by being hot dipped. Following the hot dipping, load cells as described hereinabove are installed, and all cabling is pulled and potted.

As described above, each load cell is manufactured from 1" diameter bar stock, and has two machined surfaces for the installation of the piezoelectric strain gauges. The load cell also is provided with a slot to accommodate to gauge and wire leads.

The gauges are installed in each cell and are wired prior to installation.

Following hot dipping, the holes for mounting bolts and load cells are drilled into the plate. Mounting holes for the load cells are drilled into the centre are of each bearing pad location. Mounting bolt holes are located on each side of the load cell. The mounting bolts fasten the metal foot to the plate.

The load cell wires exit the buffer of the plate and pass through the cable tracks. These wires are all sealed with a waterproof potting compound.

The load cells are oriented so that the strain gauges are parallel to both the upper surface and the lower surface of the plate. A groove on the load cell face ensures gauge orientation. The load cells are held into the scale using a weatherproof adhesive compound.

OPERATION OF PREFERRED EMBODIMENTS

In the use as a wheel load scale, the scale is placed ahead of a vehicle's tires, and the vehicle is rolled on to the scale. The scale develops a signal as a result of the weight of the wheel. The scale is able to weigh the wheel by interpreting the resulting signal.

Using the load cell as a weighing element allows the design of an accurate wheel load scale that is light, of low profile, and portable. The use of discrete loading members improves the accuracy of the sensor.

In the use as a weigh-in-motion scale, the vehicle is driven over the scale. As the vehicle moves across the scale, the scale develops a signal as a result of the weight of the moving vehicle. The scale is able to weigh the vehicle by interpreting the resulting signal.

Using the load cell as a weighing element allows the design of an accurate weigh-in-motion scale that is light, and is of low profile. The use of discrete loading members improves the accuracy of the sensor.

In the use of these scales, the bending of the plate is measured both in tension and compression in the weakened recessed area, which provides a measure of the weight loaded on the scale.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What we claim is

1. A load cell comprising: a metal rod or bar having upper and lower faces; a strain transducer secured to a portion of each of the upper and lower faces of said metal bar; a signal wire having its terminal secured to one end face of each said strain transducer; and a strain relief means interposed between each said signal wire terminal and an associated said strain transducer.

2. The load cell of claim 1 wherein said strain transducers are situated on a reduced thickness portion of said metal rod or bar.

3. The load cell of claim 2 wherein each said signal wire is disposed within a respective groove in said reduced thickness portion of said metal rod or bar.

4. The load cell of claim 2 wherein said strain transducer comprises an electric resistance-type strain gauge.

5. The load cell of claim 4 wherein said electric resistance-type strain gauge is a very thin film of highly polarized polyvinylidene fluoride.

6. The load cell of claim 2 wherein said terminal between each said signal wire and an associated said strain transducer comprises a solder terminal.

7. The load cell of claim 2 wherein each said strain relief means comprises a strain relief bubble.

8. A flat plate wheel load indicator adapted for support at its lateral edges, said plate having its lateral edges slotted to form a plurality of laterally-extending webs; a single cavity extending into each of said webs from said lateral edges; and a load cell, as claimed in claim 1, removably slidably disposed within each said cavity, said strain transducers forming part of said load cell being unadhered to any wall of said cavity.

9. The load wheel scale as claimed in claim 8, wherein said cavities are each formed by closed bores.

10. The wheel load scale as claimed in claim 9, wherein said bores start from a lateral edge of said plate and extend transversely into said plate.

11. The wheel load scale as claimed in claim 8, including a depending foot to support said plate, the other areas of said plate being unsupported.

12. The wheel load scale as claimed in claim 8, wherein each longitudinal side of said plate is provided with two such webs.

13. The wheel load scale as claimed in claim 8, wherein said plate is made of steel or aluminum or of a high-strength light metal alloy.

14. A wheel load scale as claimed in claim 8, including a handle provided in each lateral edge of the plate.

15. A wheel load scale as claimed in claim 8, including a display panel mounted on a transverse edge of the plate.

16. A wheel load scale as claimed in claim 15, wherein said display panel is supplied with electrical power from a storage battery.

17. A wheel load scale as claimed in claim 16, wherein said storage battery may be charged through a charging connector.

18. A weigh-in-motion scale comprising: a flat plate of elastic material having measuring properties, said plate being adapted to be supported at two opposed lateral edges and including pockets disposed in pairs and forming webs between them; a closed cavity provided in each web extending in a direction substantially-parallel to the upper surface of said plate; and a load cell, as claimed in claim 1, removably slidably disposed within each said cavity, said strain transducer forming part of said load cell being unadhered to any wall of said cavity.

19. The weigh-in-motion scale of claim 18, disposed in a rectangular frame, the interior thereof being provided with a peripheral frame having a plurality of scale frame bearing pads to support a like member of webs of said plate.

20. The weigh-in-motion scale as claimed in claim 18, wherein said cavities are formed by closed bores.

21. The weigh-in-motion scale as claimed in claim 20, wherein said pockets are spaced from a lateral edge of said plate, and wherein said bores start from a lateral edge of said plate and extend transversely into said plate.

22. The weigh-in-motion scale as claimed in claim 19, including a depending foot secured to each said bearing pads to support said webs, the other areas of said plate being unsupported.

23. The weigh-in-motion scale as claimed in claim 19, wherein each longitudinal side of said plate is provided with two such webs.

24. The weigh-in-motion scale as claimed in claim 18, wherein said plate is made of steel or aluminum or of a high-strength light metal alloy.

* * * * *